United States Patent [19]

Schiel

[11] Patent Number: 4,840,193

[45] Date of Patent: Jun. 20, 1989

[54] ELECTROMAGNETICALLY ACTUATABLE THREE-WAY/TWO-POSITION DIRECTIONAL CONTROL VALVE

[75] Inventor: Lothar Schiel, Hofheim, Fed. Rep. of Germany

[73] Assignee: Alfred Teves GmbH, Frankfurt am Main, Fed. Rep. of Germany

[21] Appl. No.: 211,634

[22] Filed: Jun. 27, 1988

[30] Foreign Application Priority Data

Jul. 3, 1987 [DE] Fed. Rep. of Germany ....... 3722009

[51] Int. Cl.$^4$ .............................................. F15B 13/044
[52] U.S. Cl. ............................ 137/627.5; 137/596.17; 251/129.2; 303/119
[58] Field of Search ................... 137/596.17, 627.5; 251/129.2; 303/40, 119

[56] References Cited

U.S. PATENT DOCUMENTS

| 2,336,887 | 12/1943 | Piron | 137/596.17 X |
| 3,064,670 | 11/1962 | Peras | 137/627.5 X |
| 3,854,501 | 12/1974 | Machek | 137/627.5 |
| 4,077,674 | 3/1978 | Doto | 137/627.5 X |

FOREIGN PATENT DOCUMENTS

| 3111716 | 10/1982 | Fed. Rep. of Germany | 137/627.5 |
| 897521 | 5/1962 | United Kingdom | 137/627.5 |
| 946551 | 1/1964 | United Kingdom | 137/627.5 |

Primary Examiner—Gerald A. Michalsky
Attorney, Agent, or Firm—James B. Raden

[57] ABSTRACT

Disclosed is an electromagnetically actuatable three-way/two-position directional control valve for alternatively connecting an outlet port to a first or to a second inlet port. The connection is established by way of a valve chamber with which the outlet port is in direct communication. The inlet ports each communicate with the valve chamber by way of sealing seats adapted to be closed or opened by means of a movable valve closure member. At least one electromagnet whose housing accommodates a magnet coil as well as a slidably disposed armature which, when the electromagnet is excited, actuates the valve closure member by way of a valve-actuating tappet. A connection is established between the second inlet port and the outlet port in the inactive position of the valve closure member. In order to avoid a vacuum leakage during change-over, the present invention provides that the valve closure member is formed by an elastic valve member whose sealing surface is biased in the direction of the first sealing seat by means of a compression spring in the inactive position, while, during actuation, an intermediate position of the valve member is provided in which the two sealing seats are simultaneously closed.

6 Claims, 1 Drawing Sheet

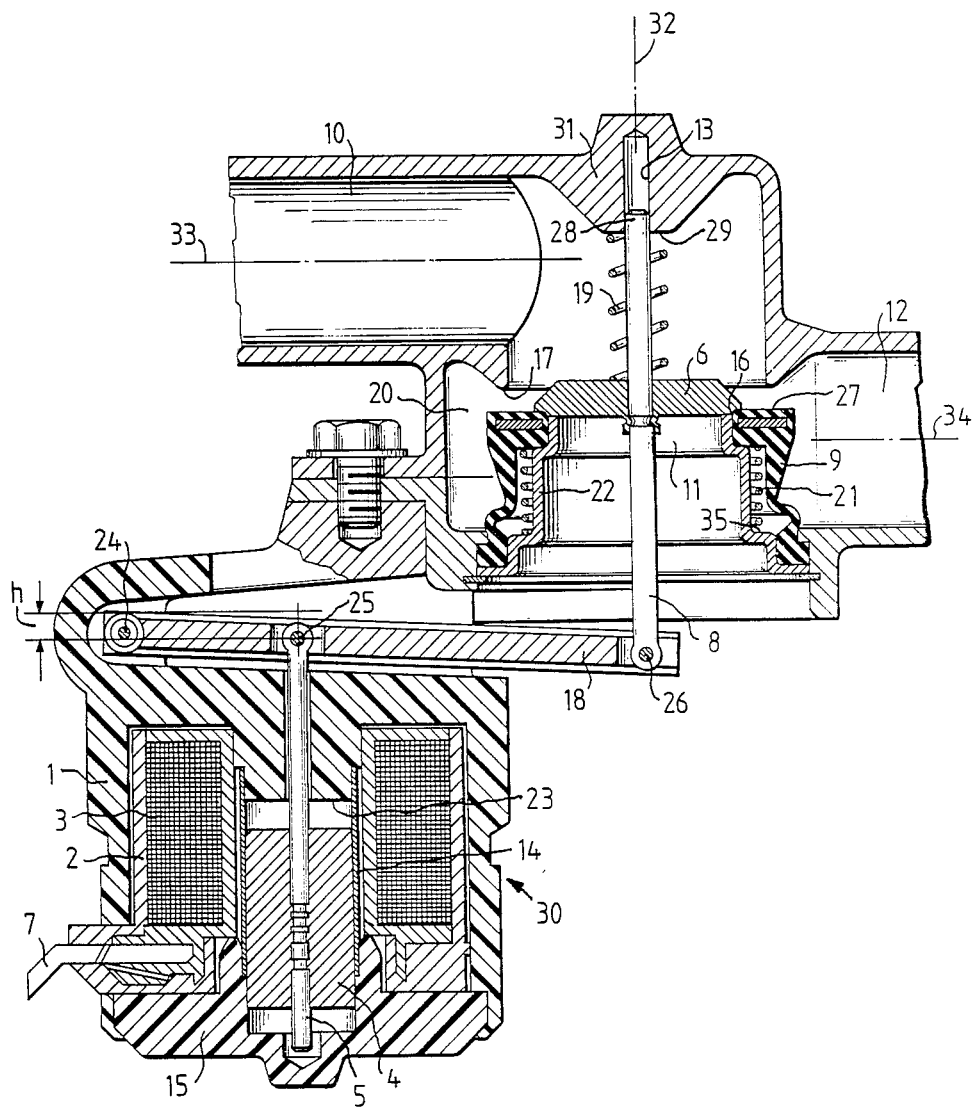

ELECTROMAGNETICALLY ACTUATABLE THREE-WAY/TWO-POSITION DIRECTIONAL CONTROL VALVE

BACKGROUND OF THE INVENTION

The present invention relates to an electromagnetically actuatable three-way/two-position directional control valve for alternatively connecting an outlet port to a first or to a second inlet port. The connection is achieved by way of a valve chamber with which the outlet port is in direct communication. The inlet ports each communicate with the valve chamber through sealing seats adapted to be closed or opened by means of a movable valve closure member. An electromagnet is provided for whose housing accommodates a magnet coil and a slidably disposed armature which is actuated when the electromagnet is excited which actuates the valve closure member by way of a valve-actuating tappet. A connection is established between the second inlet port and the outlet port in the inactive position of the valve closure member.

Heretofore, reliable operation of such a three-way/two-position directional control valve required ports of comparatively large cross-sections. Further in prior valves, the valve closure member is actuated by means of a pivotably supported actuating lever for actuating the armature or the valve-actuating tappet.

One shortcoming of such prior three-way/two-position directional control valves which is particularly evident when used as a change-over valve of a vacuum-assisted anti-lock brake system, is that they experience major vacuum leakage during change-over because the two inlet ports and the outlet port are interconnected for a short time during movement of the valve closure member. As a consequence thereof, the vacuum volume requirements are increased and the pressure change-over function is considerably impaired.

SUMMARY OF THE INVENTION

Therefore, it is an object of the present invention to provide for an improved electromagnetically actuatable three-way/two-position directional control valve of the type referred to which does not suffer from the effects of short-time connection of the ports.

This object is achieved according to the present invention in that the valve closure member is formed by an elastic valve member whose sealing surface is biased by means of a compression spring in the direction of the first sealing seat in the inactive position, while, during actuation, an intermediate position of the valve member is provided in which the two sealing seats are closed simultaneously. Accordingly, overlap of the open positions of the two sealing seats is avoided and advantageously, the reliability of operation of the three-way/two-position directional control valve is substantially increased. Furthermore, it is thereby achieved that the operation of the inventive three-way/two-position directional control valve produces extremely little noise.

According to an advantageous embodiment of the invention, the first sealing seat is designed at a valve plate secured to the actuating tappet, the said valve plate is biased by means of a resetting spring in the direction of the valve member, and the actuating tappet comprises an axial extension which is slidably guided in a valve housing. This arrangement contributes to enhance the reliability of operation, since the risk of the valve-actuating tappet becoming jammed when the actuating lever is pivoted is largely avoided.

According to another embodiment of the invention the valve member is of a rotationally symmetric design and is fastened inside the first inlet port at its end remote from the first sealing seat. The fastening is carried out by means of a cylindrical stop sleeve which, also serves to guide the valve member. This structure provides for a particularly compact design.

BRIEF DESCRIPTION OF THE DRAWING

The Drawing is a longitudinal cross-sectional view of a three-way/two-position directional control valve showing details of construction.

DETAILED DESCRIPTION OF A PREFERRED EMBODIMENT

An electromagnetically actuatable three-way/two-position directional control valve is illustrated in the Drawing and comprises in a valve housing 31 a first inlet port 11, a second inlet port 12 and an outlet port 10, whose locations have been chosen in the embodiment shown to be such that the axes of symmetry 32, 34 of the two inlet ports 11, 12 are arranged perpendicularly to each other, with the axis 33 of the outlet port 10 forming a right angle with the axis of symmetry 32 of the first inlet port 11. Preferably, all three ports 10, 11, 12 have equally large cross-sectional surfaces. The transition of the three ports 10, 11, 12 into each other forms a valve chamber 20 accommodating a first annular sealing seat 16 and a second annular sealing seat 17 as well as a valve closure member cooperating with the two sealing seats 16, 17. While the second sealing seat 17 is shaped in the valve housing 31, the first sealing seat 16 is provided at a valve plate 6 which is non-displaceably arranged on an actuating tappet 8 whose extension 28 is guided in a guidance 13 provided in the valve housing 31. The valve closure member is formed by an elastic rotationally symmetric valve member 9 which, at its one end, is fastened inside the first inlet port 11, while its other end forms a sealing surface 27 which is urged against the first sealing seat 16 by means of a compression spring 21. The valve plate 6 is pressed downwardly against the sealing surface 27 by means of a resetting spring 19. In this arrangement, the valve member 9 is fastened by means of a stop sleeve 22 which also serves as its guidance and stop in the inactive position. The other end of the resetting spring 19 takes support on a supporting surface 29 provided in the valve housing 31, while the end of the compression spring 21 remote from the sealing surface 27 moves into abutment on a radial annular surface 35 of the stop sleeve 22. The valve-actuating tappet 8 provided for actuating the valve assembly is articulated at a second point of application 26 of an actuating lever 18 which, in turn, is actuated by an electromagnet 30.

The electromagnet 30 is formed by a housing 1 closed by means of a cover 15. The housing's interior houses a magnet coil carrier 2 with a magnet coil 3 wound onto it and which is connected to an appropriate voltage source by means of contact lugs 7. The magnet coil 3 serves to displace an armature 4 which is guided in a guide sleeve 14 and is operatively and positively engaged with an actuating element 5. The actuating element 5 is articulated at a first point of application 25 of the actuating lever 18 which is pivotably supported at a point of rotation 24 on the housing. The two points of application 25, 26 are preferably designed as elongated holes. The stroke h of the armature 4 is confined by a radial stop surface 23 provided in the housing 1.

The mode of operation of the inventive electromagnetically actuatable three-way/two-position directional control valve is as follows:

When the electromagnet 30 is not excited, the valve member 9 assumes the inactive position shown in the drawing by the effect of the resetting spring 19, so that there is a connection between the second inlet port 12 and the outlet port 10. When a voltage is applied to the magnet coil 3, a magnet force will act on the armature 4 which must be greater than the resetting force generated by the resetting spring 19 taking into consideration the lever transmission. The effect of the magnet force causes the armature 4 to move upwards, as viewed in the drawing, and to entrain the actuating element 5. As a result, the actuating lever 18 is swivelled upwardly so that the actuating tappet 8 and the valve plate 6 move also upwardly. This movement will be followed immediately by the preloaded sealing surface 27 of the valve closure member 9 so that the first sealing seat 16 remains closed during the initial phase of the change-over action. In a subsequent intermediate position, the second sealing seat 17 is also closed, whereupon in the course of further movement, the first sealing seat 16 is lifted from the sealing surface 27. This terminates the change-over of the three-way/two-position directional control valve and establishes a connection between the first inlet port 11 and the outlet port 10. Upon disconnection of the voltage applied to the magnet coil 3, the described course of action will take place in reverse order.

What is claimed is:

1. An electromagnetically actuatable three-way/two-position directional control valve for alternatively connecting an outlet port to a first and to a second inlet port, comprising a valve chamber with which the outlet port is in direct communication, the inlet ports respectively communicate with said valve chamber through two sealing seats adapted to be alternatively closed or opened by means of a movable valve closure member, at least one electromagnet comprising a housing accommodating a magnet coil and a slidably disposed armature, said armature operatively connected to said electromagnet and valve closure member by a valve-actuating tappet such that when the electromagnet is excited, said armature actuates the valve closure member, a connection being established between the second inlet port and the outlet port in an inactive position of the valve closure member, wherein the valve closure member includes an elastic valve member having a sealing surface biased by a compression spring in a direction of the first sealing seat in the inactive position, said valve closure member being movable relative to a valve plate which cooperates with said sealing surface of said elastic valve member, said valve plate biased downwardly against said sealing surface by resilient resetting means in the inactive position of the closure member, and during actuation of said electromagnet, an intermediate position of the valve member is provided for in which intermediate position the two sealing seats are simultaneously closed.

2. The electromagnetically actuatable three-way/two-position directional control valve as claimed in claim 1, wherein the actuating tappet comprises an axial extension which is slidably guided in a valve housing.

3. The electromagnetically actuatable three-way/two-position directional control valve as claimed in claim 2, wherein a resetting spring is arranged between the valve plate and a supporting surface in the valve housing and encompasses the extension.

4. The electromagnetically actuatable three-way/two-position directional control valve as claimed in claim 1, wherein the valve member is of rotationally symmetric design and is fastened inside the first inlet port at its end remote from the first sealing seat.

5. The electromagnetically actuatable three-way/two-position directional control valve as claimed in claim 4, wherein the valve member is fastened by means of a cylindrical stop sleeve which stop sleeve also guides said valve member.

6. The electromagnetically actuatable three-way/two-position directional control valve as claimed in claim 5, wherein the compression spring biasing the sealing surface of the valve member is supported on the stop sleeve.

* * * * *